United States Patent
Lin et al.

(10) Patent No.: US 10,409,336 B2
(45) Date of Patent: Sep. 10, 2019

(54) ELECTRONIC DEVICE

(71) Applicants: Che-Hsien Lin, Taipei (TW); Che-Hsien Chu, Taipei (TW); Wei-Ning Chai, Taipei (TW); Chen-Hsien Cheng, Taipei (TW); Li-Fang Chen, Taipei (TW); Chun-An Shen, Taipei (TW); Yi-Hsuan Wu, Taipei (TW)

(72) Inventors: Che-Hsien Lin, Taipei (TW); Che-Hsien Chu, Taipei (TW); Wei-Ning Chai, Taipei (TW); Chen-Hsien Cheng, Taipei (TW); Li-Fang Chen, Taipei (TW); Chun-An Shen, Taipei (TW); Yi-Hsuan Wu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/990,828

(22) Filed: May 29, 2018

(65) Prior Publication Data
US 2019/0018460 A1  Jan. 17, 2019

Related U.S. Application Data

(60) Provisional application No. 62/512,177, filed on May 29, 2017, provisional application No. 62/660,254, filed on Apr. 20, 2018.

(51) Int. Cl.
*H05K 5/00* (2006.01)
*G06F 1/16* (2006.01)

(52) U.S. Cl.
CPC .......... *G06F 1/1683* (2013.01); *G06F 1/1618* (2013.01)

(58) Field of Classification Search
CPC ...................................................... H05K 5/00
See application file for complete search history.

(56) References Cited

U.S. PATENT DOCUMENTS

| 8,891,244 | B2 * | 11/2014 | Yang | G06F 1/1681 |
|           |      |         |      | 361/679.27 |
| 9,507,388 | B1 | 11/2016 | Hampton et al. | |
| 2005/0155184 | A1 * | 7/2005 | Kayl | G06F 1/1618 |
|           |      |         |      | 16/366 |

FOREIGN PATENT DOCUMENTS

| CN | 203465630 | 3/2014 |
| TW | 558305 | 10/2003 |

(Continued)

OTHER PUBLICATIONS

"Office Action of Taiwan Counterpart Application", dated Jan. 14, 2019, p. 1-p. 6.

*Primary Examiner* — Jerry Wu
(74) *Attorney, Agent, or Firm* — JCIPRNET

(57) ABSTRACT

An electronic device including a first body having a first recess, a second body having a second recess corresponding to the first recess, and at least one dual-shaft hinge module connected to the first and the second bodies and disposed at inner sides of the first and the second bodies. The first and the second bodies rotate relatively via the dual-shaft binge module to be opened or closed. The dual-shaft hinge module has a dual protrusion structure movably accommodated in the first and the second recesses, and the dual protrusion structure moves into or out of the first and the second recesses when the first and the second bodies rotate relatively via the dual-shaft hinge module.

22 Claims, 19 Drawing Sheets

(56) References Cited

FOREIGN PATENT DOCUMENTS

| TW | M275639 | 9/2005 |
|----|---------|--------|
| TW | I384831 | 2/2013 |
| TW | M476214 | 4/2014 |
| TW | I506209 | 11/2015 |

* cited by examiner

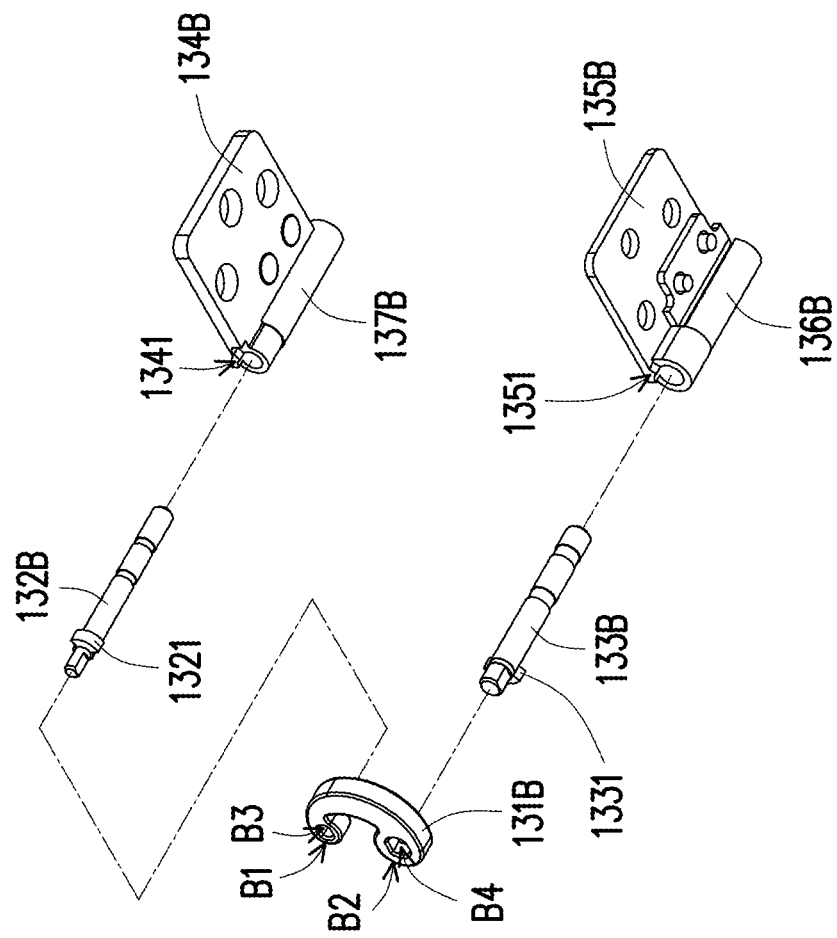

US 10,409,336 B2

ELECTRONIC DEVICE

CROSS-REFERENCE TO RELATED APPLICATION

This application claims the priority benefits of U.S. provisional application Ser. No. 62/512,177, filed on May 29, 2017, and U.S. provisional application Ser. No. 62/660,254, filed on Apr. 20, 2018. The entirety of each of the above-mentioned patent applications is hereby incorporated by reference herein and made a part of specification.

FIELD OF THE INVENTION

The invention is directed to an electronic device.

DESCRIPTION OF RELATED ART

An electronic device, for example, a notebook computer, is basically composed of a display screen and a host system that can be opened or closed relative to each other, and what is employed for the relative opening or closing operation of the display screen and the host system is mainly a hinge module disposed between the display screen and the host system. In recent years, such electronic device may further allow the display screen to rotate at a wide angle range from 0 to 360 degrees via a dual-shaft hinge module to be opened or closed, which is further stacked to a flat state, and provides users with different operation types via such deformation trend.

However, a currently available dual-shaft hinge module usually has to be additionally disposed at side edges of bodies, such that the bodies can successfully rotate in the aforementioned wide angle range to be opened or closed without causing any structural interference. In this way, it cause unnecessary visual effect to the structure, which is unfavorable for the notebook computer to be designed toward visual effects of compactness, aesthetics and so on.

SUMMARY

The invention provides an electronic device which connects different bodies via a dual-shaft hinge module and provides a hidden visual effect and a neat appearance in coordination with recesses of the bodies.

An electronic device of the invention includes a first body, a second body and at least one dual-shaft hinge module. The first body has at least one first recess, and the second body has at least one second recess corresponding to the first recess. The dual-shaft hinge module is connected to the first body and the second body, thereby driving the first body and the second body to relatively rotate via the dual-shaft hinge module to be opened or closed. The dual-shaft hinge module has a dual protrusion structure movably accommodated in the first recess and the second recess. The dual-shaft hinge module moves into or out of the first recess and the second recess when the first body and the second body relatively rotates via the dual-shaft hinge module.

To sum up, in the electronic device, in addition to the dual-shaft hinge module being connected to the first body and the second body, thereby driving them to relatively rotate to be opened or closed, the dual-shaft hinge module has the dual protrusion structure for being movably accommodated in different recesses of the bodies. When the bodies rotates via the dual-shaft hinge module to be opened or closed, the dual protrusion structure can be allowed to correspondingly move in the different recesses, thereby visually creating an effect of hidden hinge module, as well as preventing structural interference for the bodies to rotate in a wide angle range via the dual-shaft hinge module to be opened or closed.

In order to make the aforementioned and other features and advantages of the invention more comprehensible, several embodiments accompanied with figures are described in detail below.

BRIEF DESCRIPTION OF THE DRAWINGS

FIG. 2B and FIG. 2C are respectively enlarged views showing a part of components of the electronic device depicted in FIG. 2A.

DESCRIPTION OF EMBODIMENTS

Figure 1A:
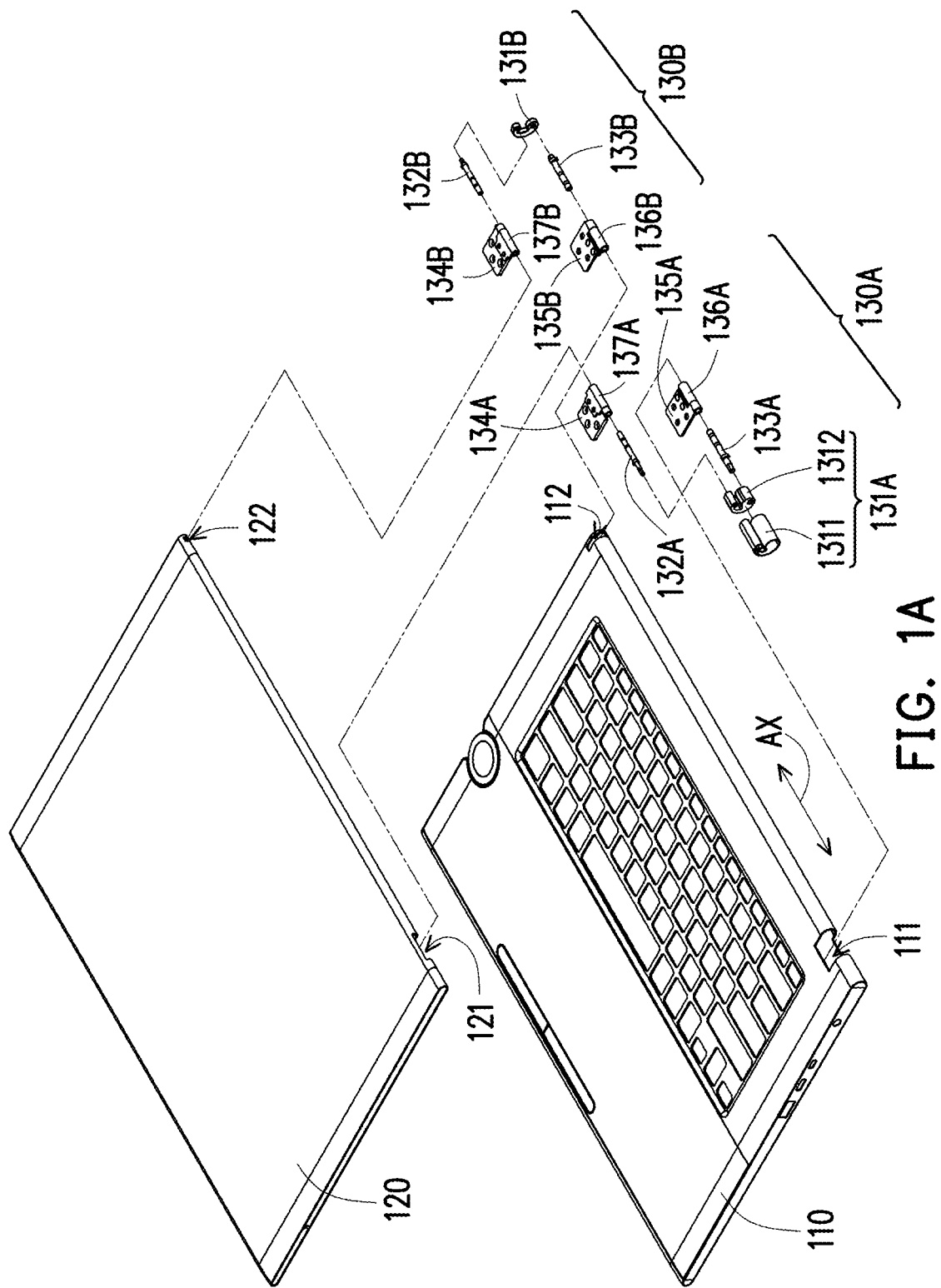
FIG. 1A is an exploded view of an electronic device according to an embodiment of the invention.
Figure 1B:
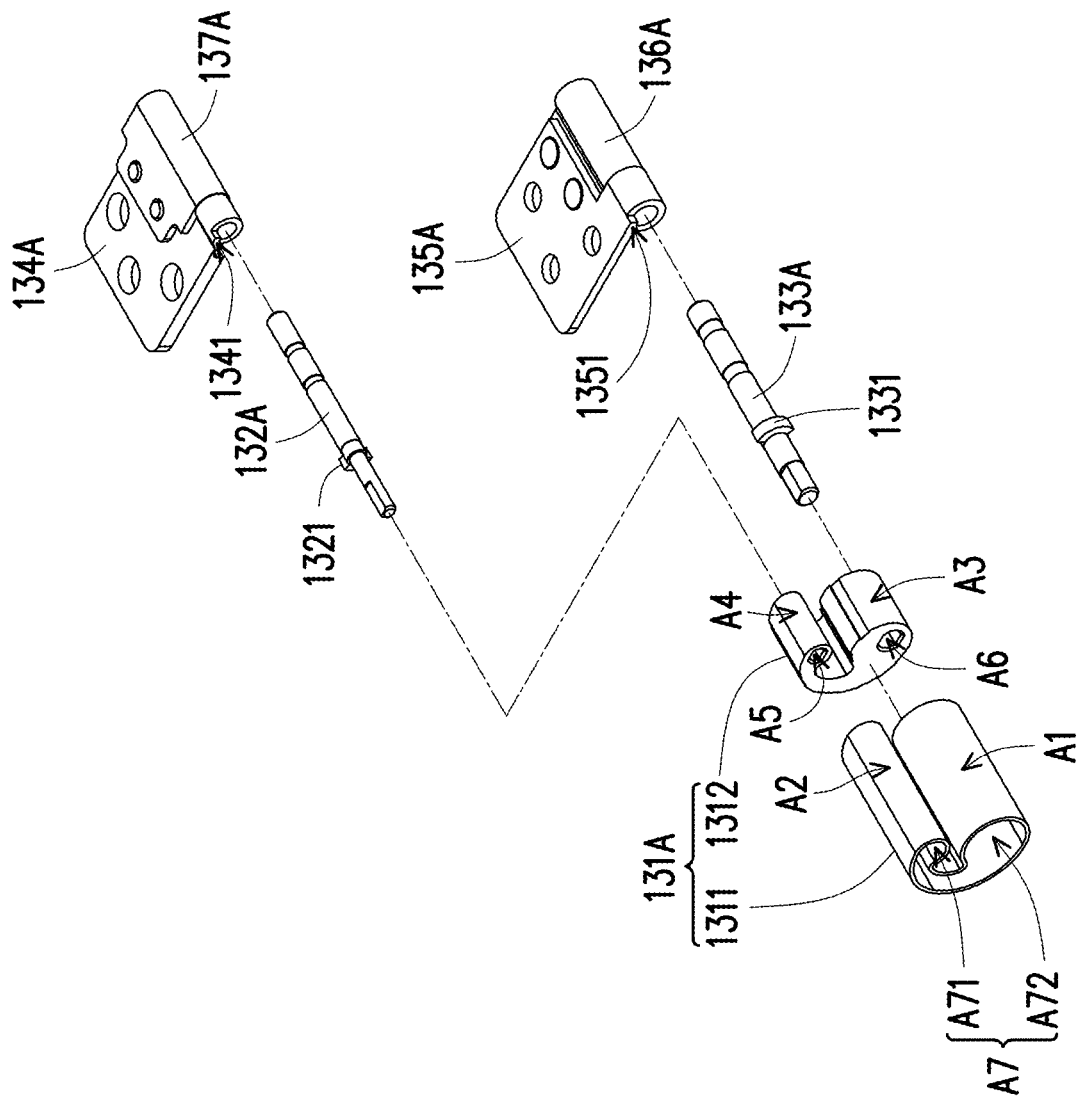
FIG. 1B and FIG. 1C are respectively enlarged views of the electronic device depicted in FIG. 1A.
Figure 1C:
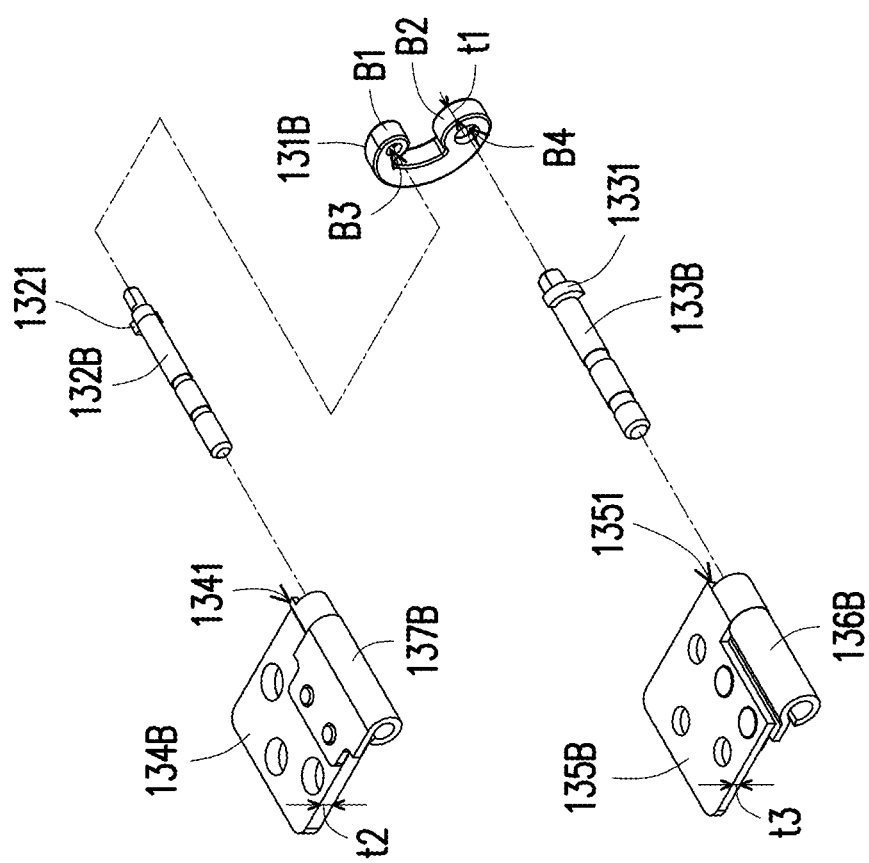
Figure 2A:
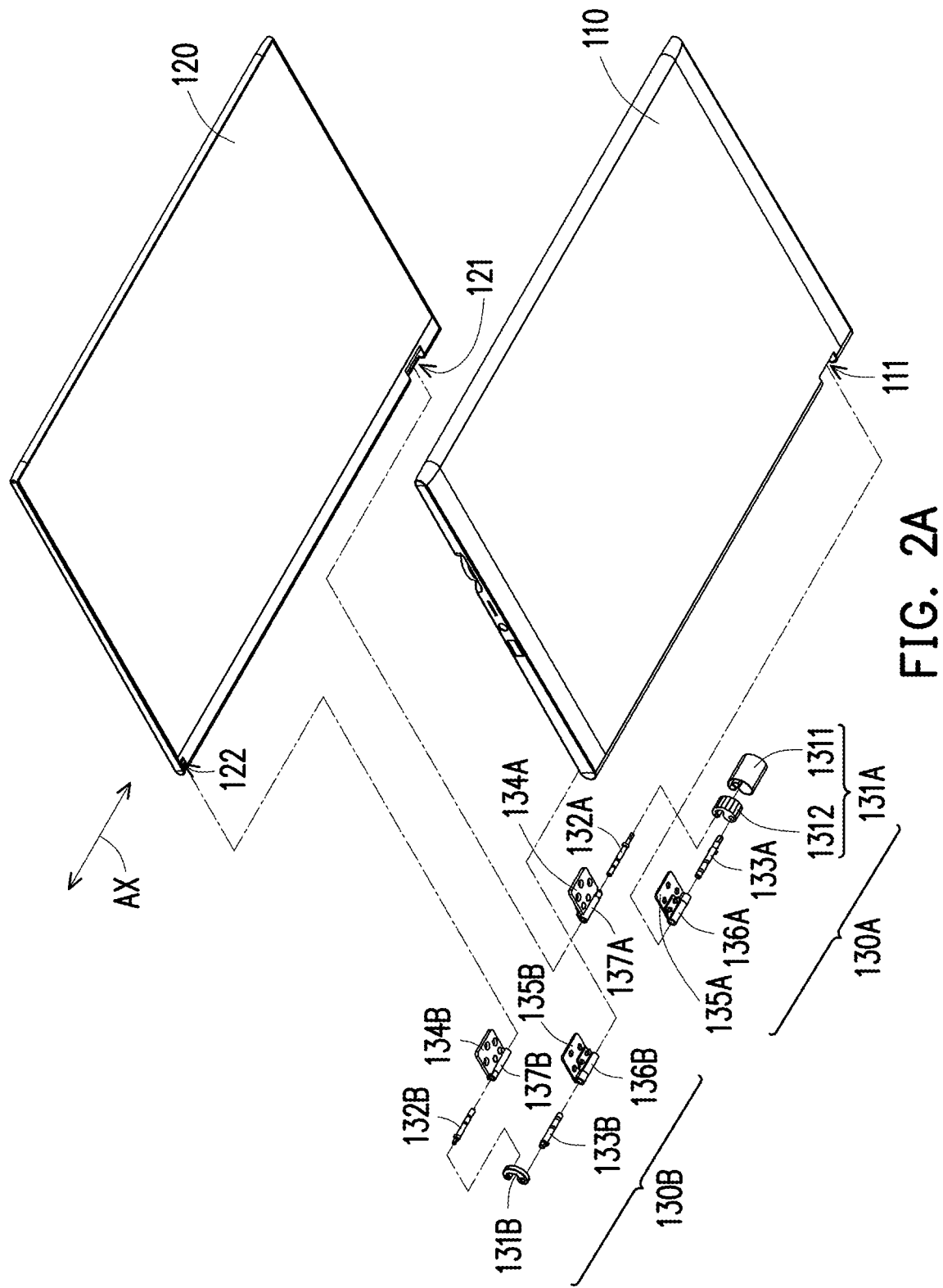
FIG. 2A illustrates the electronic device depicted in FIG. 1A from another view angle.
Figure 2B:
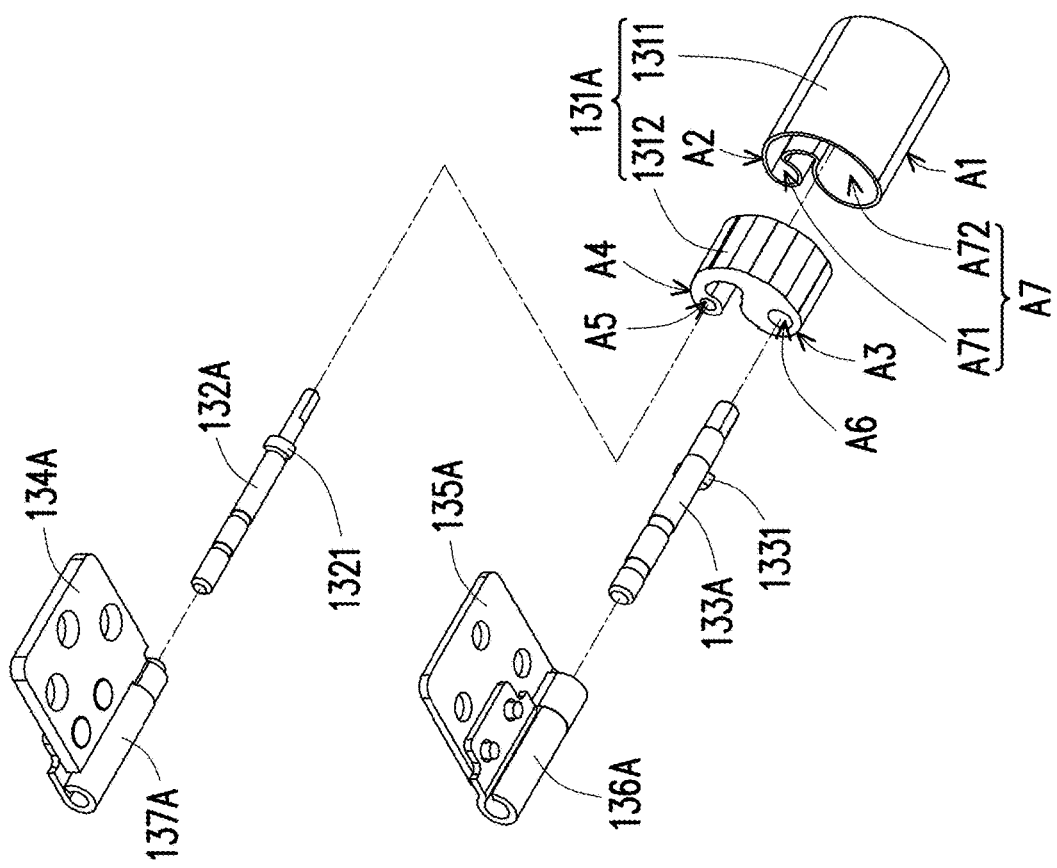

FIG. 1A is an exploded view of an electronic device according to an embodiment of the invention. FIG. 1B and FIG. 1C are respectively enlarged views of the electronic device depicted in FIG. 1A. FIG. 2A illustrates the electronic device depicted in FIG. 1A from another view angle. FIG. 2B and FIG. 2C are respectively enlarged views showing a part of components of the electronic device depicted in FIG. 2A. Referring first to FIG. 1A and FIG. 2A, in the present embodiment, an electronic device 100 is, for example, a notebook computer and includes a first body 110, a second body 120 and at least one dual-shaft hinge module, which is illustrated as including a first dual-shaft hinge module 130A and a second dual-shaft hinge module 130B for example, but the invention is not limited thereto. The first dual-shaft hinge module 130A and the second dual-shaft hinge module 130B are respectively disposed at an inner side of the first body 110 and an inner side of the second body 120.

The structure and the assembly relationship of each of the dual-shaft hinge modules are first described below. FIG. 1B and FIG. 2B are enlarged views showing the first dual-shaft hinge module 130A, and FIG. 1C and FIG. 2C are enlarged views showing the second dual-shaft hinge module 130B. Referring first to FIG. 1B and FIG. 2B in comparison with FIG. 1A and FIG. 2A, in the present embodiment, the first dual-shaft hinge module 130A includes a first dual-shaft hinge, a first fixing member 1312 and a cover body 1311. The first dual-shaft hinge described herein is composed of a first hinge and a second hinge, wherein the first hinge includes a first shaft 133A, a first torque element 136A and a first bracket 135A, and the second hinge includes a second shaft 132A, a second torque element 137A and a second bracket 134A. As illustrated in FIG. 1A and FIG. 2A, an end of the first dual-shaft hinge is assembled to the first body 110 and the second body 120, another end of the first dual-shaft hinge is assembled to the first fixing member 1312, and the first fixing member 1312 is assembled into the cover body 1311. In other words, the first shaft 133A and the first bracket 135A are assembled to form the first hinge to be assembled between the first body 110 and the first fixing member 1312, while the second shaft 132A and the second bracket 134A after being assembled are assembled between the second body 110 and the first fixing member 1312.

Additionally, the first bracket 135A is assembled and fixed into the first body 110, an end of the first shaft 133A is assembled (pivoted) to the first torque element 136A, so as to be pivoted to the first bracket 135A. Thus, when the first hinge rotates, i.e., the first shaft 133A and the first bracket 135A co-axially rotate relative to each other, a curl structure of the first torque element 136A generates friction with the first shaft 133A, thereby causing the first hinge to generate a torque. In the same way, the second bracket 134A is assembled into the second body 120, an end of the second shaft 132A is assembled (pivoted) to the second torque element 137A, so as to be pivoted to the second bracket 134A. Thus, when the second hinge rotates, i.e., the second shaft 132A and the second bracket 134A co-axially rotate relative to each other, a curl structure of the second torque element 137A generates friction with the second shaft 132A, thereby causing the second hinge to generate a torque. It should be mentioned that the same structural disposition and effect also appear in the second dual-shaft hinge module 130B, namely, the first shaft 133B with the first bracket 135B, as well as the second shaft 132B with the second bracket 134B of it both may generate required torques in the same way as in the first dual-shaft hinge, which will not be repeatedly described. In this case, the first dual-shaft hinge and the second dual-shaft hinge has a consistent extending axial direction AX, and the torques generated by the first dual-shaft hinge and the second dual-shaft hinge are substantially the same. The second dual-shaft hinge module 130E located at another side of the electronic device 100 also has the similar structure.

It should be noted that either the first dual-shaft hinge module 130A or second dual-shaft hinge module 130B has a dual protrusion structure to have a corresponding structural relationship with recesses of the first body 110 and the second body 120, which will be further described below.

To be detailed, referring again to FIG. 1B and FIG. 2B in comparison with FIG. 1A and FIG. 2A, in the present embodiment, the first body 110 has first recesses 111 and 112, and the second body 120 has second recesses 121 and 122. Along the extending axial direction AX of the first dual-shaft hinge module 130A or of the second dual-shaft hinge module 130B, the first recesses 111 and 112 have different axial dimensions, wherein the axial dimension of the first recess 111 is greater than the axial dimension of the first recess 112. In the same way, an axial dimension of the second recess 121 is greater than that of the second recess 122. The first recess 111 and the second recess 121 correspond to each other and have the consistent axial dimension and the first recess 112 and the second recess 122 correspond to each other and have the consistent axial dimension. Accordingly, the first dual-shaft hinge module 130A may be considered as being movably accommodated in the first recess 111 and the second recess 121, the second dual-shaft hinge module 130B may be considered as being movably accommodated in first recess 112 and the second recess 122, a dimension of a first dual protrusion structure 131A along the extending axial direction AX is greater than a dimension of the second dual protrusion structure (i.e., the second fixing member 131B) along the extending axial direction AX.

In the first dual-shaft hinge module 130A, ends of the first shaft 133A and the second shaft 132A which are far away from the first bracket 135A and the second bracket 134A are fixed to the first fixing member 1312, and then, the first fixing member 1312 is assembled into the cover body 1311 to form the first dual protrusion structure 131A. The cover body 1311 presents a dual-protrusion contour having different outer diameter sizes, namely, an outer diameter size of a protrusion portion A1 is greater than an outer diameter size of a protrusion portion A2. In this way, a space A7 in the cover body 1311 is also divided into a larger space A72 and a smaller space A71. Similarly, the first fixing member 1312 also has a dual-protrusion contour, wherein an outer diameter size of a protrusion portion A3 is greater than an outer diameter size of a protrusion portion A4, and the protrusion portion A3 and A4 are respective adapted to the spaces A72 and A71, so as to be embedded into the cover body 1311. The protrusion portion A3 and A4 respectively have fixing holes A6 and A5, and each of them presents a cylindrical contour with two sides (opposite sides) flattened, such that the first shaft 133A and the second shaft 132A may be correspondingly fixed thereto.

It should be noted that in favor of a user's operation habit of applying a force to the second body 120 (i.e., a display screen) to drive it to rotate relative to the first body 110 (i.e., a host system), thereby corresponding to the second hinge (including the second shaft 132A and the second bracket 134A) of the second body 120, the torque generated by the second hinge when rotating is smaller than the torque generated by the first hinge (including the first shaft 133A and the first bracket 135A) when rotating, such that the user may drive the second body 120 to rotate relative to the first body 110 to be opened or closed to achieve an effort-saving effect.

Similarly, in order to achieve force balance between the first dual-shaft hinge module 130A and the second dual-shaft hinge module 130B, for the second dual-shaft hinge module 130B, the torque generated by the second hinge (including the second shaft 132B, the second torque element 137B and the second bracket 134B) when rotating is smaller than the torque generated by the first hinge (including the first shaft 133B, the first torque element 136B and the first bracket 135B) when rotating. In the meantime, in the second dual-shaft hinge module 130B, ends of the first shaft 133B and the second shaft 132B which are far away from the first bracket 135B and the second bracket 134B are respectively fixed to the second fixing member 131B via the same fixing relationship that the first shaft 133A and the second shaft 132A are respectively fixed to the first fixing member 1312. The first shaft 133B and the second shaft 132B are also adaptively fixed via cylindrical contours with each two sides (opposite sides) flattened, so as to be respectively inserted to fixing holes B3 and B4 of protrusion portions B1 and B2. In this case, the second fixing member 131B forms the dual protrusion structure of the second dual-shaft hinge module 130B, and an outer diameter size of the protrusion portion B2 is greater than an outer diameter size of the protrusion portion B1.

Figure 3:
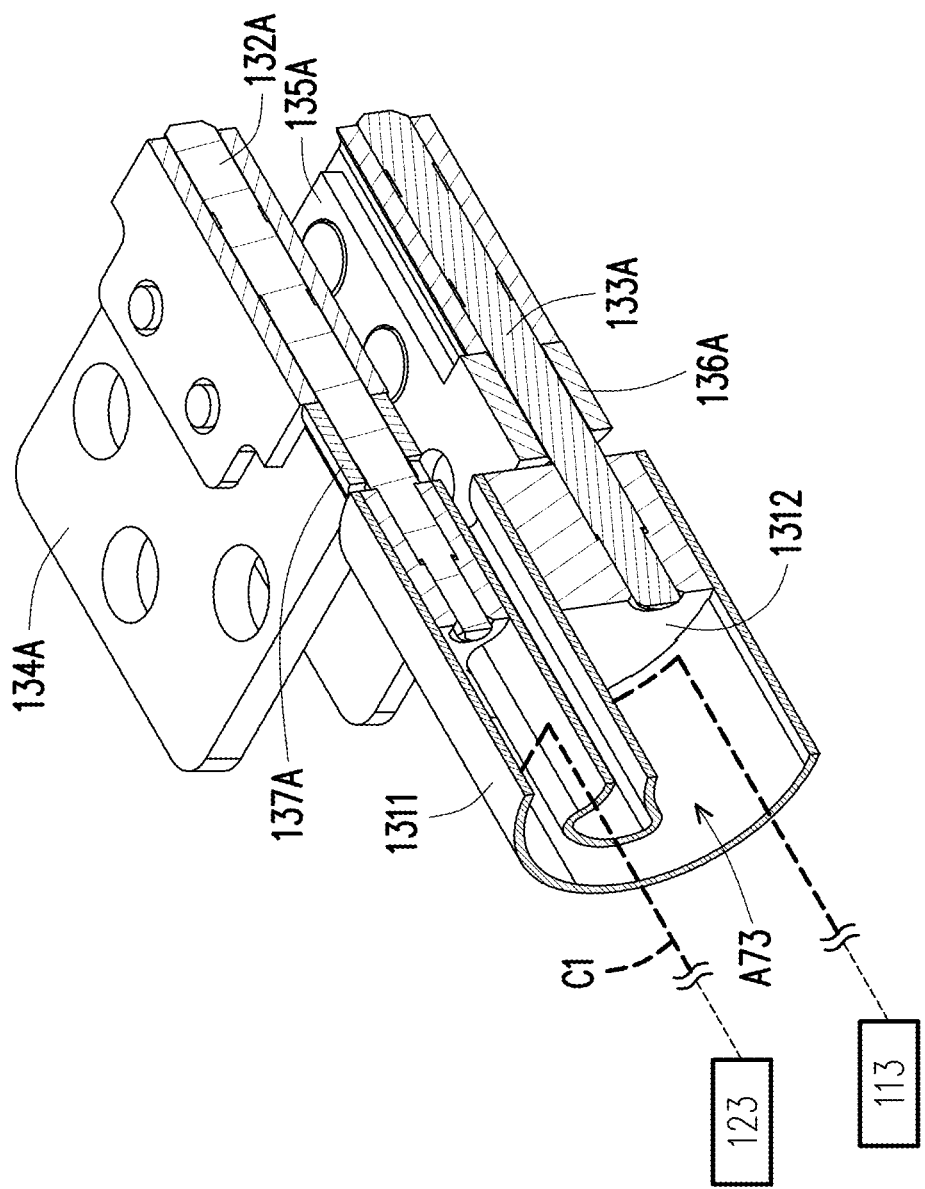
FIG. 3 is a partial cross-sectional view showing the first dual-shaft hinge module of the electronic device depicted in FIG. 1A.

FIG. 3 is a partial cross-sectional view showing the first dual-shaft hinge module of the electronic device depicted in FIG. 1A. Referring to FIG. 1B, FIG. 2B and FIG. 3, in the present embodiment, after the first fixing member 1312 is embedded into the cover body 1311, a space A73 that is not filled with the first fixing member 1312 remains, while an electronic module 113 is further disposed in the first body 110, and an electronic module 123 is further disposed in the second body 120. Accordingly, a conductive wire C1 of the electronic device 100 may be electrically connected between the electronic modules 113 and 123 bypassing through the space A73, thereby providing a wire space between the electronic modules 113 and 123 to prevent a risk that the conductive wire C1 may be damaged due to being exposed.

Figure 4A:
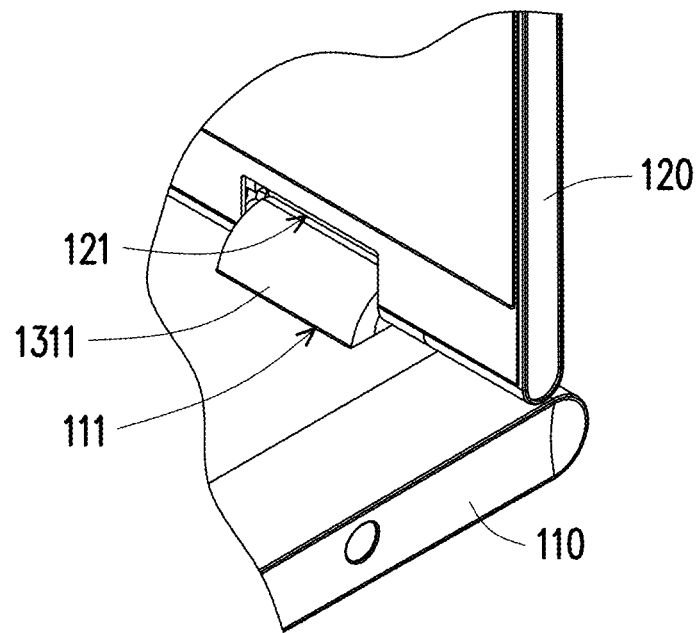
FIG. 4A to FIG. 4H are partial schematic views showing the electronic device in different states.
Figure 4B:
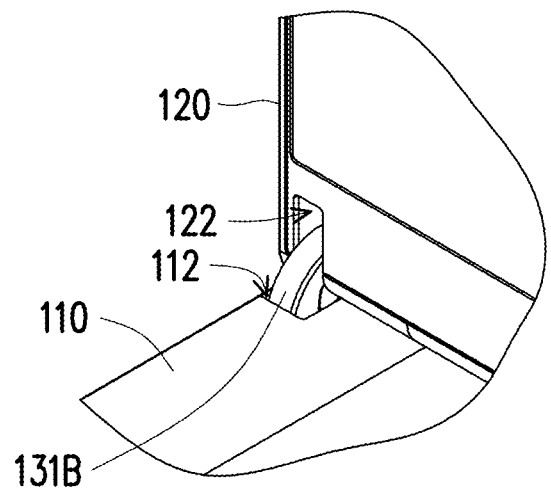
Figure 4C:
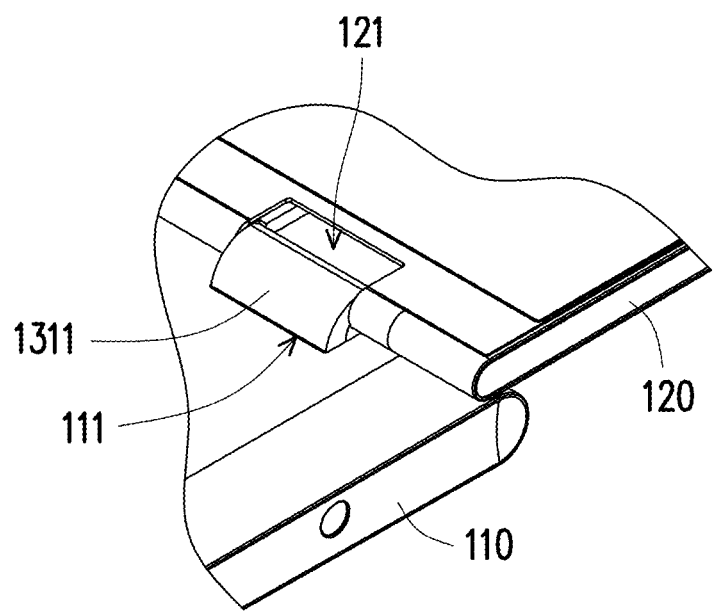
Figure 4D:
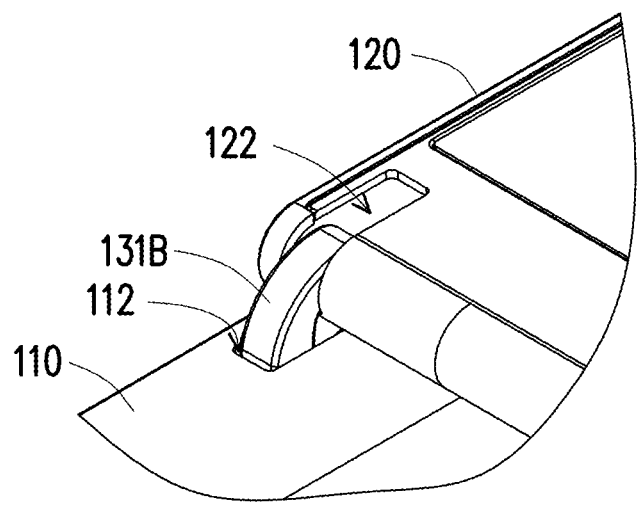
Figure 4E:
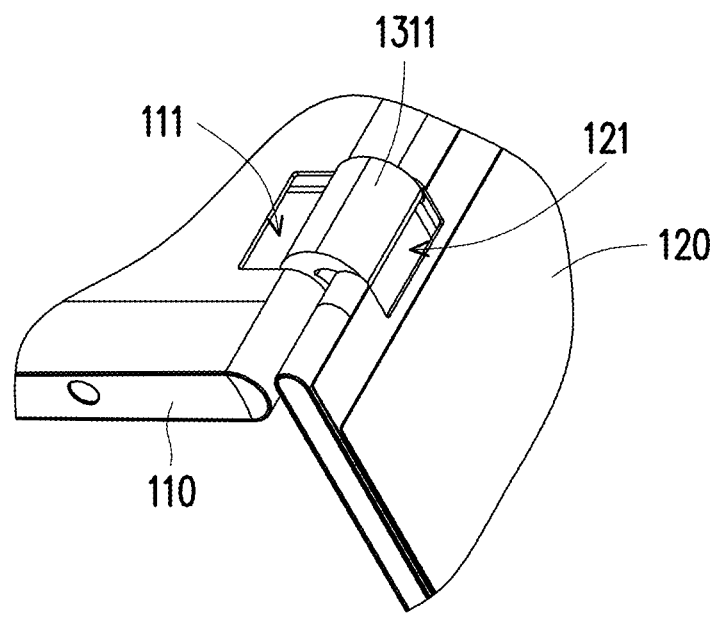
Figure 4F:
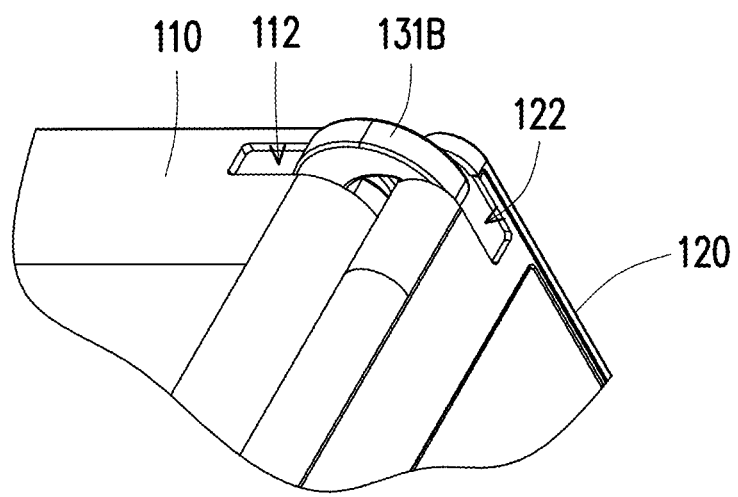
Figure 4G:
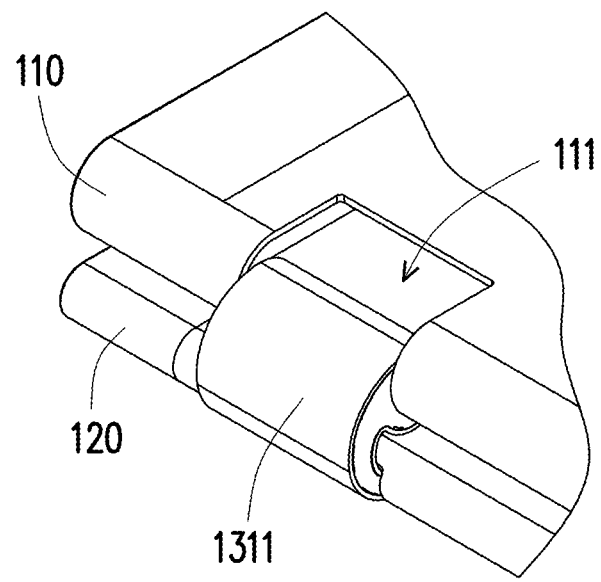
Figure 4H:
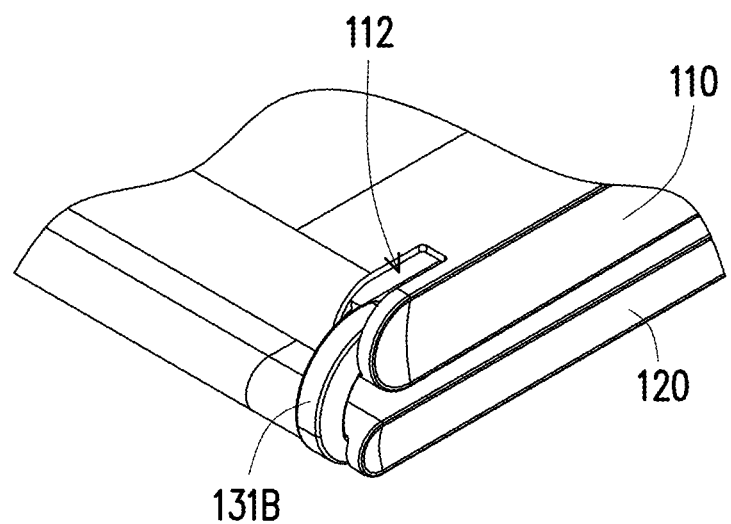
Figure 5A:
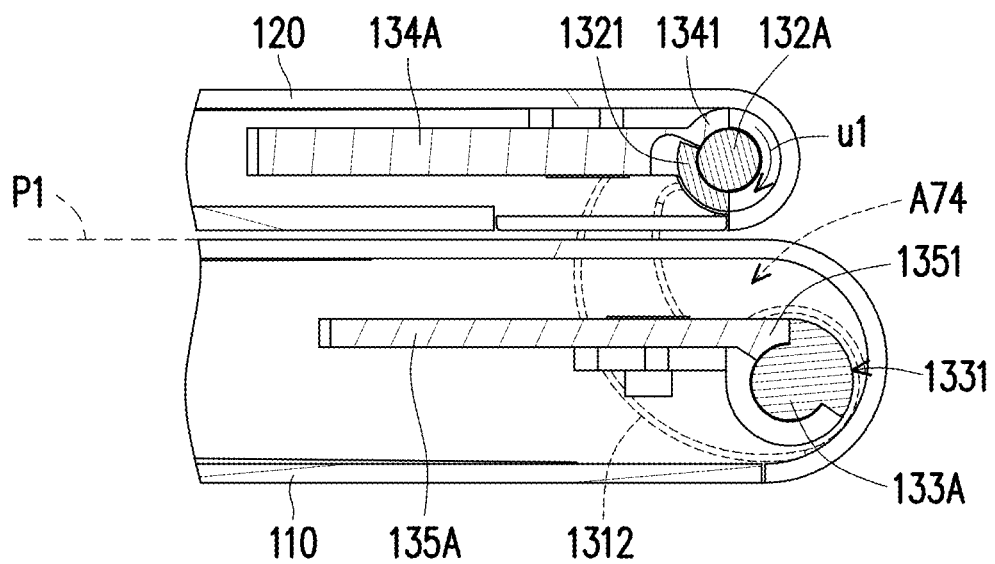
FIG. 5A to FIG. 5E are partial cross-sectional views showing the electronic device in different states.
Figure 5B:
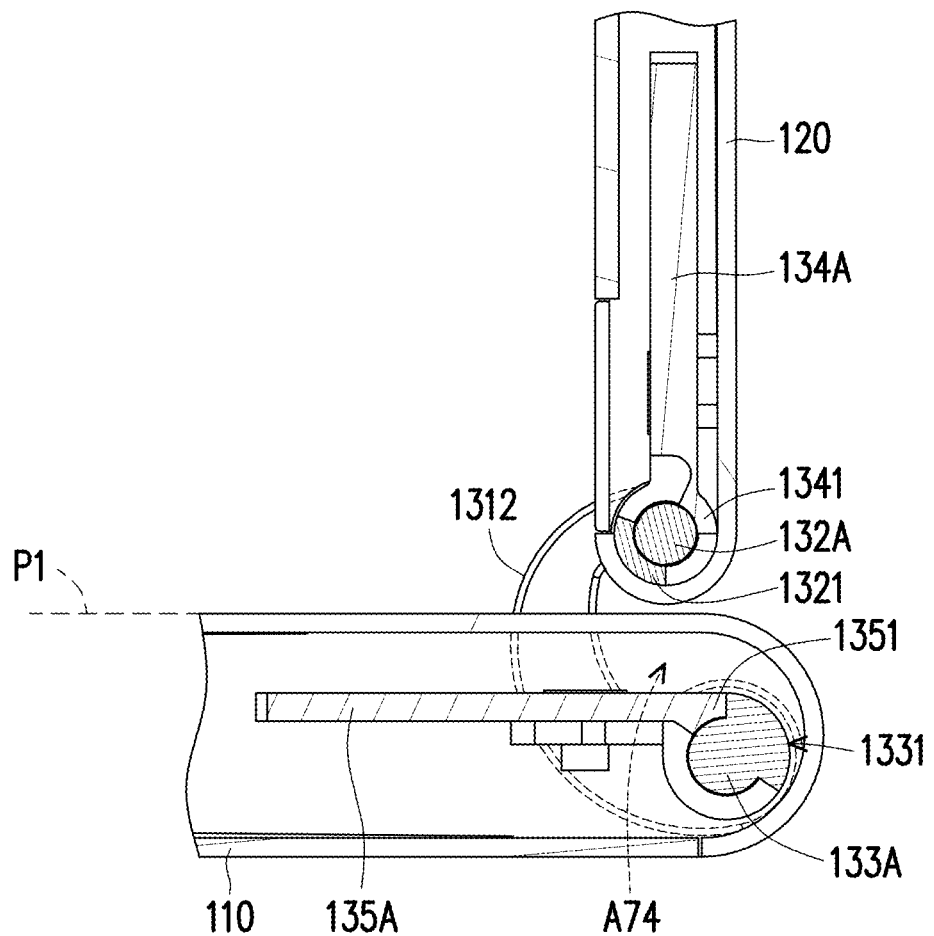
Figure 5C:
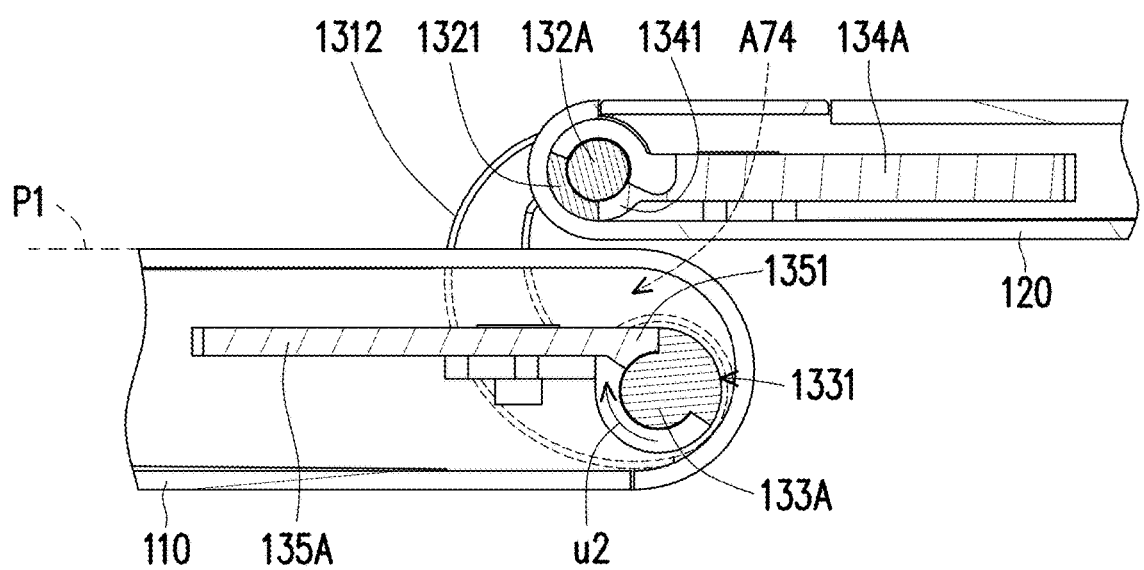
Figure 5D:
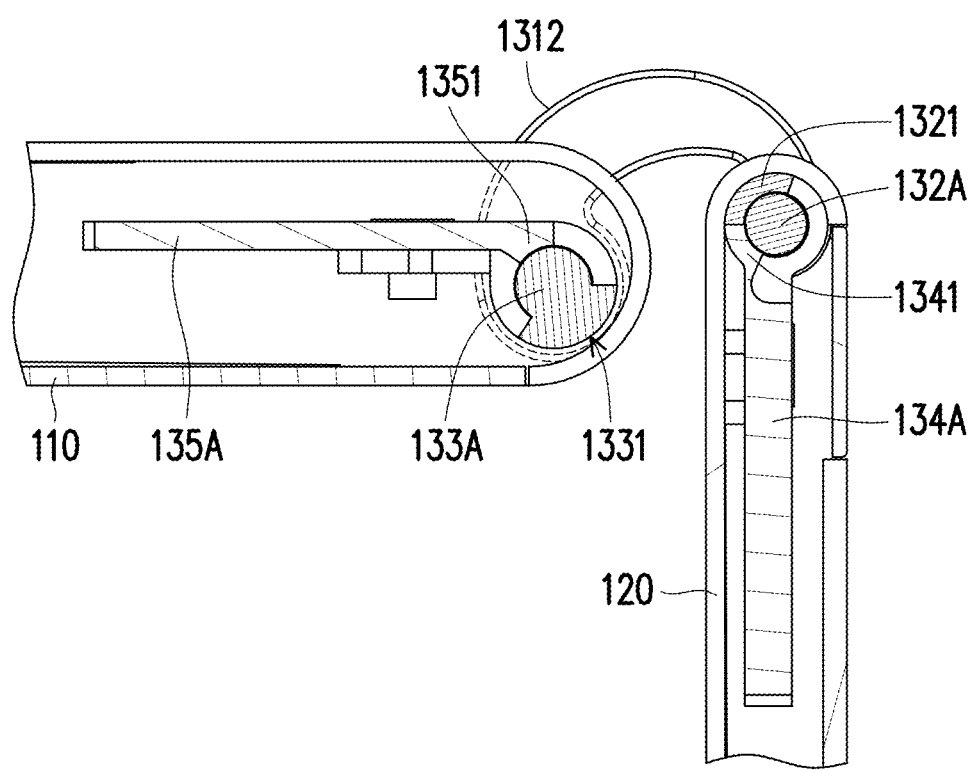

FIG. 4A to FIG. 4H are partial schematic views showing the electronic device in different states. FIG. 5A to FIG. 5E are partial cross-sectional views showing the electronic device in different states. FIG. 4A and FIG. 4B illustrate the same state and correspond to FIG. 5B, FIG. 4C and FIG. 4D illustrate the same state and correspond to FIG. 5C, FIG. 4E and FIG. 4F illustrate the same state and correspond to FIG. 5D, and FIG. 4G and FIG. 4H illustrate the same state and correspond to FIG. 5E.

In the present embodiment, the first dual-shaft hinge module 130A and the second dual-shaft hinge module 130B are respectively provided with the dual protrusion structures (i.e., the first dual protrusion structure 131A and the second fixing member 131B), and thus, in coordination with the first recesses 111 and 112 and the second recesses 121 and 122 of the bodies, a hidden hinge may be formed in the electronic device 100. In this case, the first body 110 and the second body 120 are in a closed state according to FIG. 1A and FIG. 2A. Especially, the dimensions of the first recesses 111 and 112 and the dimensions of the second recesses 121 and 122 vary along the extending axial direction AX, thereby controlling dimensions of the first dual-shaft hinge module 130A and the second dual-shaft hinge module 130B which are exposed to the outside. Thereby, the dimension of the second dual-shaft hinge module 130B is less exposed to the outside due to being limited by the first recess 112 and the second recess 122. Especially, the second dual-shaft hinge module 130B, due to being limited by the first recess 112 and the second recess 122, may create a visually hidden effect as well as provide an additional appearance effect in the presence of visual asymmetry.

Then, referring to FIG. 4A and FIG. 4B, it may be considered that the second body 120 and the first body 110 relatively rotate to be changed from the closed state illustrated in FIG. 1A and FIG. 2A to a 90-degree state. In this circumstance, the cover body 133 of the first dual-shaft hinge module 130A may be considered as moving out of the first recess 121, and the second fixing member 131B of the second dual-shaft hinge module 130B may be considered as moving out of the second recess 122.

Referring to FIG. 4C and FIG. 4D, it may be considered that the second body 120 and the first body 110 continue to relatively rotates to be changed from the 90-degree state illustrated in FIG. 4A and FIG. 4B to a 180-degree state. In this circumstance, the second body 120 continuously rotates, such that the first recess 121 is no longer covered by the cover body 1311, but the cover body 1311, relative to the first recess 111, is still maintained at the same position corresponding to the 90-degree state. The second recess 122 of the second body 120 is thus no longer covered by the second fixing member 131B of the second dual-shaft hinge module 130B, and the second fixing member 131B, relative to the first recess 112, is also still maintained at the same position corresponding to the 90-degree state.

Referring to FIG. 4E and FIG. 4F, in this circumstance, the second body 120 and the first body 110 continue to relatively turn to be in a 270-like degree state. Because the first dual-shaft hinge module 130A and the second dual-shaft hinge module 130B are driven by the second body 120 during the process of turning, i.e., the cover body 1311 and the second fixing member 131B are driven to rotate relative to the first body 110. Thus, the first recess 111 and the second recess 121 are no longer covered by the cover body 1311, and the first recess 112 and the second recess 122 are no longer covered by the second fixing member 131B.

Referring to FIG. 4G and FIG. 4H, in this circumstance, the second body 120 is turned over and presents in a stacking state of being located on a back surface of the first body 110. In this circumstance, the cover body 1311 may be considered that without a part thereof connected with the bodies, the rest are moved out of the first recess 111 and the second recess 121. Similarly, the second fixing member 131B may be considered that without a part thereof connected with the bodies, the rest are moved out of the first recess 112 and the second recess 122.

Description related to a mechanism that the first body 110 and the second body 120 relatively rotate via the first dual-shaft hinge module 130A and the second dual-shaft hinge module 130B will be set forth in detail below.

In the present embodiment, because the first dual-shaft hinge module 130A and the second dual-shaft hinge module 130B have the same rotation mechanism, the first dual-shaft hinge module 130A is taken as an example for description, and the second dual-shaft hinge module 130B will not be repeatedly described. Referring first to FIG. 1B, FIG. 1C, FIG. 2B and FIG. 2C, the first shaft 133A has a first stop portion 1331, the first bracket 135A has a second stop portion 1351, and the first shaft 133A is pivoted to the first bracket 135A to cause the first stop portion 1331 and the second stop portion 1351 to be located on the same path. The second shaft 132A has a third stop portion 1321, the second bracket 134A has a fourth stop portion 1341, and the second shaft 132A is pivoted to the second bracket 134A to cause the third stop portion 1321 and the fourth stop portion 1341 to be located on the same path.

Herein, the change process that the user applies a force to the second body 120 to drive it to rotate relative to the first body 110 is described in the same way. As illustrated in FIG. 5A, when the electronic device 100 is in the closed state, the fourth stop portion 1341 abuts against a side of the third stop portion 1321 and has a moving path u1 in this circumstance. Then, referring to FIG. 5A and FIG. 5B, during the process of the electronic device 100 being changed from the closed state to the 90-degree state, the second body 120 drives the second bracket 134A to rotate, thereby driving the fourth stop portion 1341 to move along the moving path u1. Then, referring to FIG. 5B and FIG. 5C, the second body 120 drives the second bracket 134A to continuously rotate until the fourth stop portion 1341 moves to, abuts against and is interfered with another side of the third stop portion 1321. In this circumstance, the electronic device 100 is in the 180-degree state. It should be further mentioned that for the first stop portion 1331 and the second stop portion 1351, they are maintained in the same state without being changed during the process from FIG. 5A to FIG. 5C. It is to be further mentioned that for an upper surface P1 of the first body 110, as the dual protrusion structure still exists in a space A74 located outside, during the process from FIG. 5A (the bodies are located in the closed positions) to FIG. 5C (the bodies are located in the expanded position), the first body 110 and the second body 120 may be considered as being partially accommodated in the space A74. The pivot of the protrusion portion A1 (labelled in FIG. 1B and FIG. 2B) of the dual protrusion structure to the first body 110 may be considered as being under the upper surface P1, and the pivot of the protrusion portion A2 to the second body 120 may be considered as being above the upper surface P1.

Figure 5E:
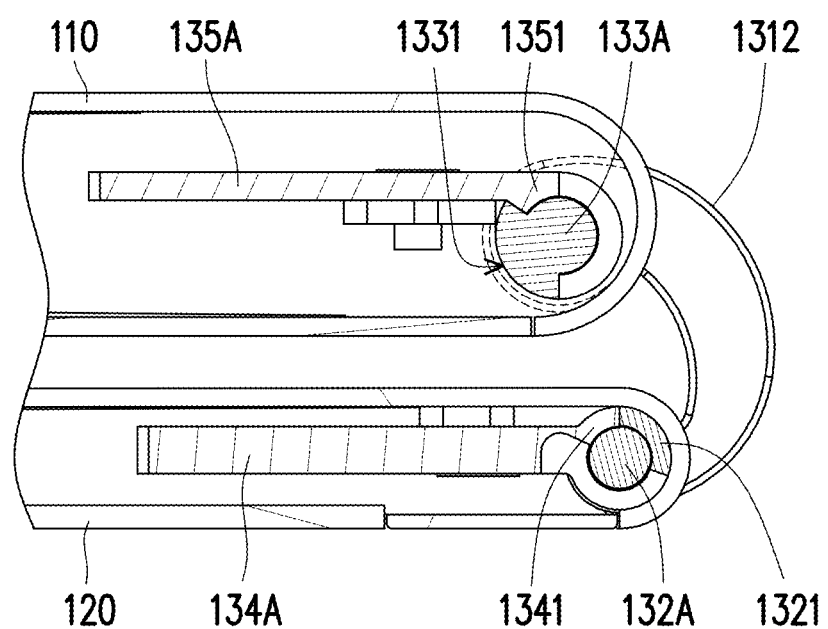

Referring to FIG. 5C and FIG. 5D, the second body 120 continuously rotates. However, as the fourth stop portion 1341 is interfered with the third stop portion 1321, the second hinge (including the second shaft 132A and the second bracket 134A) no longer perform the pivoting operation. Instead, the second body 120, by driving the first dual protrusion structure 131A (which is represented by the cover body 1312) to rotate relative to the first body 110 via the second hinge, drives the first stop portion 1331 to start to move from a side of the second stop portion 1351 along a moving path u2. Referring to FIG. 5D and FIG. 5E, when the second body 120 is changed to the stacking state of being located on the back surface of the first body 110, it represents that the first stop portion 1331 is stopped by and interfered with the second stop portion 1351, and up to now, the first hinge (including the first shaft 133A and the first bracket 135A) no longer pivotally rotates. The cover body 1312, without the part connected with the bodies, is totally moved out of the first recess 111 and the second recess 121, which is considered as termination of the rotation of the second body 120 relative to the first body 110. It should be further mentioned that when the relative operations illustrated in FIG. 5A to FIG. 5E are performed in reverse, the second body 120 is changed back to the closed state and is stacked on a front surface of the first body 110.

Figure 6A:
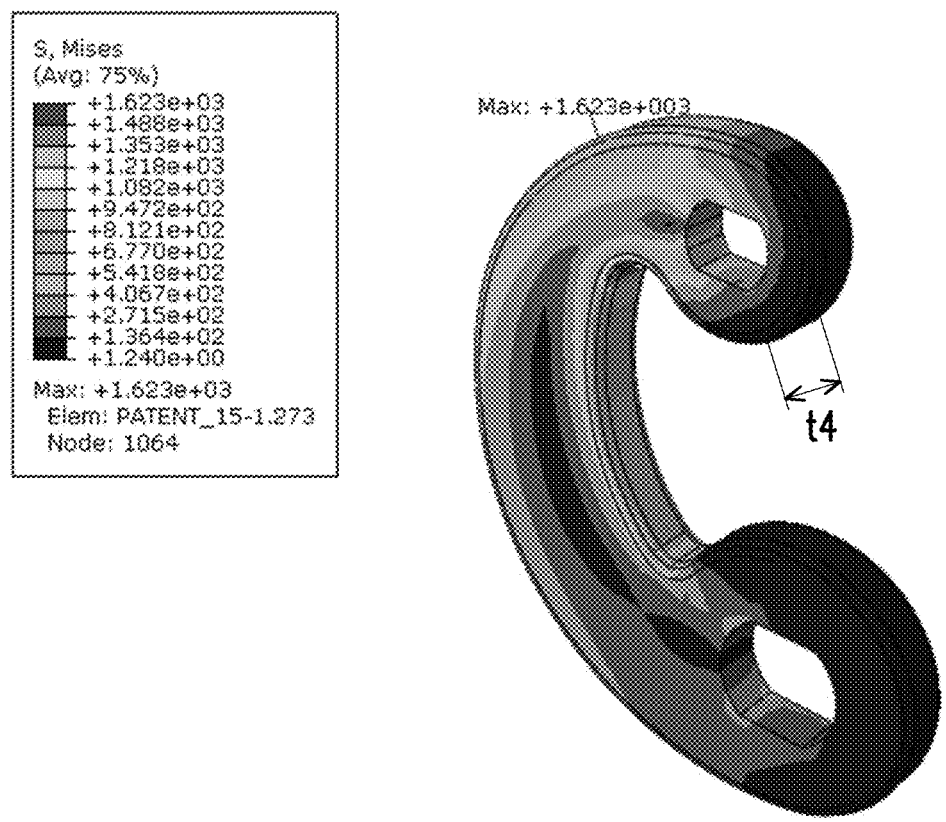
FIG. 6A and FIG. 6B are respectively computer aided engineering (CAE) analysis of the fixing members.
Figure 6B:
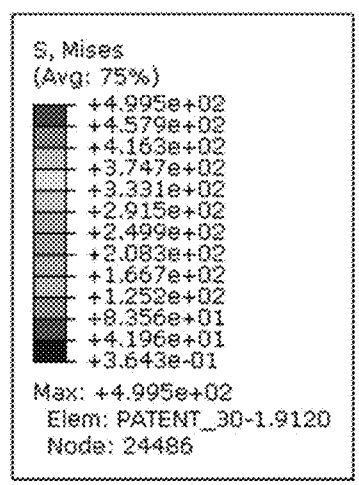
Figure 6B:
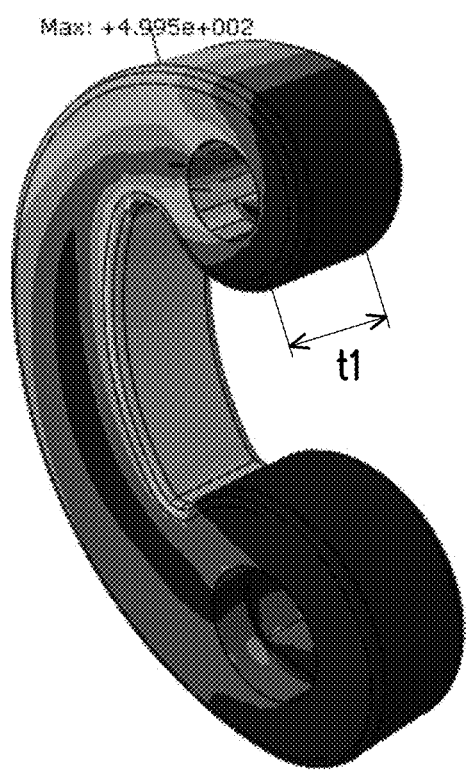

FIG. 6A and FIG. 6B are respectively computer aided engineering (CAE) analysis of the fixing members. Referring simultaneously to FIG. 1C, FIG. 6A and FIG. 6B, in the present embodiment, in order to ensure the first dual-shaft hinge module 130A and the second dual-shaft hinge module 130B to provide the torques required for supporting the bodies, related optimization has to be performed to improve the structural strength. It should be mentioned first that in the present embodiment, the dimension of the first dual protrusion structure 131A is greater than second dual protrusion structure (i.e., the second fixing member 131B) along the extending axial direction AX, and thus, as illustrated in FIG. 1C, a designer only has to perform optimization on a thickness of the second dual protrusion structure (i.e., the second fixing member 131B) (because the first dual protrusion structure 131A having the greater dimension naturally has greater structural strength than the second dual protrusion structure). In this case, a thickness t3 of the first bracket 135B and a thickness t2 of the second bracket 134B serves as bases, and the present embodiment, due to the thickness t3 being smaller than the thickness t2, naturally serves the thickness t2 as the basis for optimizing the thickness t1 of the second fixing member 131B (because the structural strength which may meet the thickness t2 may naturally meet the structural strength required by the thickness t3).

To be detailed, the thickness t1 of the second dual protrusion structure along the extending axial direction AX (i.e., an axial direction of the first binge or an axial direction of the second hinge) is greater than or equal to 1.5 times of the thickness (i.e., the thickness t2) of the second bracket 134B, and more preferably, the thickness t1 is 1.5 times to triple of the thickness t2, thereby limiting an extreme value of the thickness t1 of the second dual protrusion structure (i.e., the second fixing member 131B). In the meantime, the extreme value may further be performed with an aided design according to the CAE analysis illustrated in FIG. 6A and FIG. 6B, and as illustrated in FIG. 6A, it represents that when the thickness t4 is smaller than the thickness t1, the extreme value of a structural stress may be easily reached, which results in structural damage, fracture and so on. Thus, with the CAE aided design, the second fixing member 131B may be optimized to have the aforementioned thickness t1.

Figure 7A:
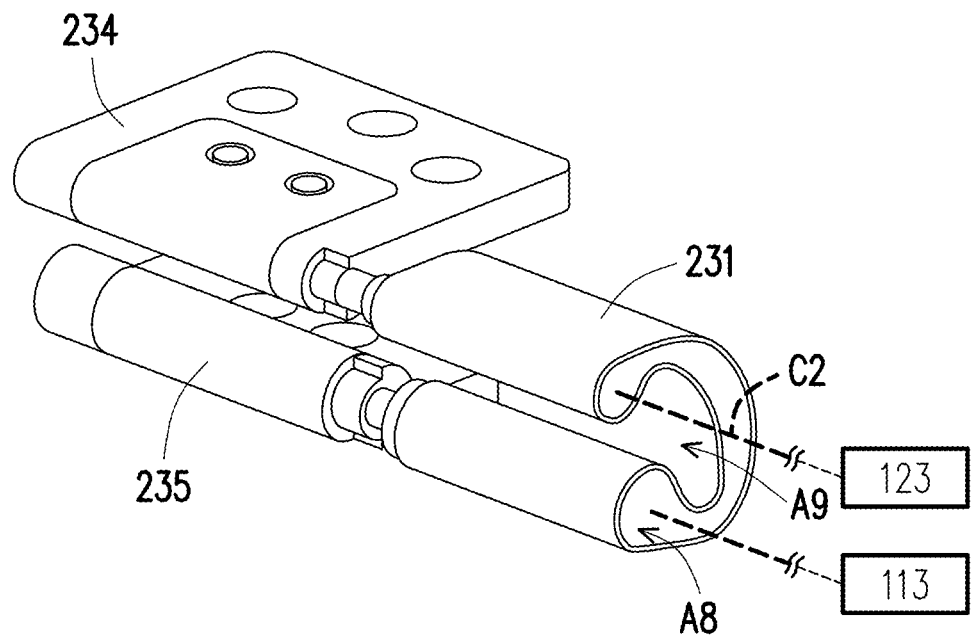
FIG. 7A is a schematic view of a dual-shaft hinge module according to another embodiment of the invention.
Figure 7B:
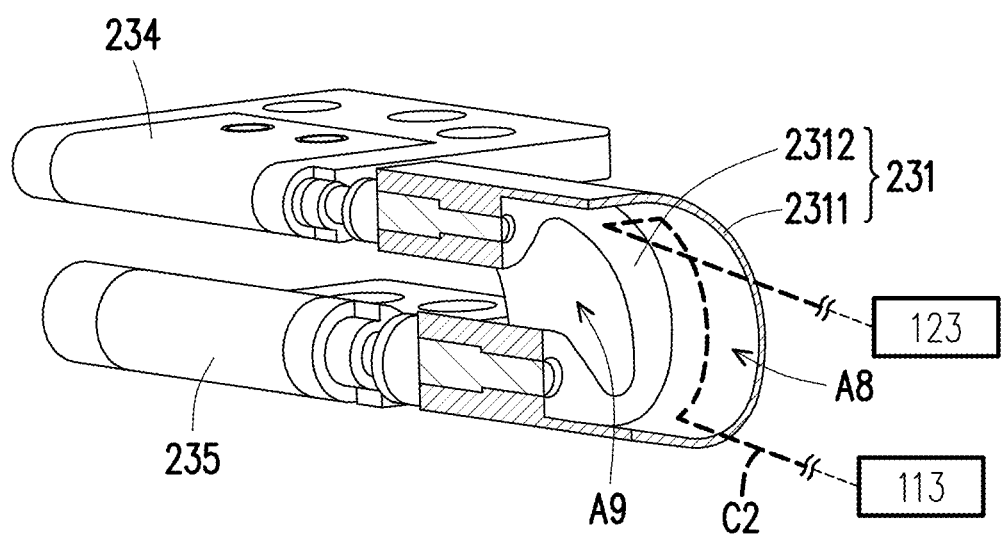
FIG. 7B is a partial cross-sectional view of the dual-shaft hinge module depicted in FIG. 7A.

FIG. 7A is a schematic view of a dual-shaft hinge module according to another embodiment of the invention. FIG. 7B is a partial cross-sectional view of the dual-shaft hinge module depicted in FIG. 7A. Referring simultaneously to FIG. 7A and FIG. 7B, being different from the aforementioned embodiment, in a dual-shaft hinge module of the present embodiment, the fixing member 231 includes an outer structure 2311 and an inner structure 2312 which are an integrally formed structure. The inner structure 2312 is equivalent to the fixing member 1312 of the aforementioned embodiment, and the outer structure is equivalent to the cover body 1311 of the aforementioned embodiment, which namely, may by equivalently considered as the cover body 1311 and the fixing member 1312 of the aforementioned embodiment being integrated as one. Regarding the other parts, for example, a first bracket 235 assembled to the first body and a second bracket 234 assembled to the second body also have the similar dual protrusion structure of the aforementioned embodiment, which facilitates the first body and the second body to rotate via the dual-shaft hinge module to be opened or closed. These parts are the same as those in the aforementioned embodiment and will not be repeated. In this case, because an inner space of the outer structure 2311 is not filled with the inner structure 2312, a space A8 may be formed for the conductive wire C2 to pass through to be electrically connected between the electronic modules 113 and 123. It is also to be mentioned that the fixing member 231 of the present embodiment also has an yielding space A9 located outside (i.e., outside the outer structure 2311, which is equivalent to be outside the aforementioned cover body 1311). The yielding space A9 is located between a pair of protrusion portions of the dual protrusion structure, which facilitates the first body and the second body, when rotating via the dual-shaft hinge module to be opened or closed, to pass through the yielding space A9 and avoid structural interference. In the meanwhile, according to the present embodiment and the aforementioned embodiment, it may be further known that the dual protrusion structure of the invention may be a ⊏-shaped structure, a L-shaped structure or a C-shaped structure, which is adaptively adjusted according to the shape contours and moving states of the first body, the second body and the dual-shaft hinge module.

Based on the above, in the embodiments of the invention, in addition to the dual-shaft hinge module being connected to the first body and the second body to drive them to relatively rotate to be opened or closed, the dual-shaft hinge module has the dual protrusion structure for being movable accommodated in different recesses of the bodies. When the bodies rotate via the dual-shaft hinge module to be opened or closed, the dual protrusion structure can correspondingly move in the different recesses, thereby visually creating an effect of hidden hinge module, as well as preventing structural interference for the bodies to rotate in a wide angle range via the dual-shaft hinge module to be opened or closed.

Moreover, for the electronic device, it can produce a visually asymmetric effect via the first dual protrusion structure and the second dual protrusion structure having different dimensions along the axial direction. The first dual protrusion structure with the greater dimension is formed by the first fixing member assembled into the cover body, thereby forming the space in the cover body, such that the conductive wire can be electrically connected to different electronic modules to pass through to provide the desired electric wire function for the first body and the second body as well as facilitate the electronic device to have a neat appearance.

Relatively, the second dual protrusion structure where no wire space is disposed is formed by the second fixing member, and meanwhile, with the CAE aided design, the thickness of the second fixing member can be correspondingly optimized based on the thickness of the first bracket and the thickness of the second bracket (which is the thicker is obtained) to achieve both the neat appearance and the structural strength.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
    a first body, having at least one first recess; a second body, having at least one second recess corresponding to the at least one first recess; and at least one dual-shaft hinge module, disposed at inner sides of the first body and the second body and connected to the first body and the second body, thereby driving the first body and the second body to relatively rotate via the dual-shaft hinge module to be opened or closed, wherein the dual-shaft hinge module has a dual protrusion structure being movably accommodated in the first recess and the second recess, and the dual-shaft hinge module moves into or out of the first recess and the second recess when the first body and the second body relatively rotate via the dual-shaft hinge module; and the dual-shaft hinge module comprises: a first hinge and a second hinge assembled to the first and second bodies respectively; a fixing member, assembled into a cover body and formed a C-shaped structure together with the cover body, the fixing member having a first protrusion portion and a second protrusion portion respectively at two ends of the C-shaped structure and forming an accommodation space in the C-shaped structure for a conductive wire to pass through; wherein the first hinge and the second hinge are assembled to the first and second protrusion portions respectively.

2. The electronic device according to claim 1, wherein the dual-shaft hinge module comprises:
    a first hinge, assembled to the first body;
    a second hinge, assembled to the second body, and
    a fixing member, having the dual protrusion structure, wherein the first hinge and the second hinge are respectively assembled to the fixing member.

3. The electronic device according to claim 1, wherein the dual-shaft hinge module comprises:
    a first hinge, having a first shaft, a first torque element and a first bracket, the first bracket and the first torque element being pivoted to an end of the first shaft, another end of the first shaft being fixed to a side of the dual protrusion structure, and the first bracket being connected to the first body; and
    a second hinge, having a second shaft, a second torque element and a second bracket, the second bracket and the second torque element being pivoted to an end of the second shaft, another end of the second shaft being fixed to another side of the dual protrusion structure, and the second bracket being connected to the second body.

4. The electronic device according to claim 3, wherein a torque of the first hinge is greater than a torque of the second hinge.

5. The electronic device according to claim 3, wherein the dual protrusion structure has a thickness along an axial direction of the first hinge or an axial direction of the second hinge, and the thickness is greater than or equal to 1.5 times of a thickness of the first bracket, or the thickness is greater than or equal to 1.5 times of a thickness of the second bracket.

6. The electronic device according to claim 5, wherein the thickness is 1.5 times to triple of the thickness of the first bracket, or the thickness is 1.5 times to triple of the thickness of the second bracket.

7. The electronic device according to claim 3, wherein the first shaft has a first stop portion, the first bracket has a second stop portion, and the first shaft is pivoted to the first bracket, thereby allowing the first stop portion and the second stop portion to be located on a same path, and the second shaft has a third stop portion, the second bracket has a fourth stop portion, and the second shaft is pivoted to the second bracket, thereby allowing the third stop portion and the fourth stop portion to be located on a same path.

8. The electronic device according to claim 1, wherein the dual protrusion structure comprises protrusion portions having different outer diameter sizes.

9. The electronic device according to claim 1, wherein an outside of the cover body provides a yielding space, and the yielding space is located between a pair of protrusion portions of the dual protrusion structure.

10. The electronic device according to claim 1, comprising:
    a first dual-shaft hinge module, having a first dual-shaft hinge, a first fixing member and a cover body, wherein an end of the first dual-shaft hinge is assembled to the first body and the second body, another end of the first dual-shaft hinge is assembled to the first fixing member, and the first fixing member is assembled to the cover body to form a first dual protrusion structure; and
    a second dual-shaft hinge module, having a second dual-shaft hinge and a second fixing member, wherein an end of the second dual-shaft hinge is assembled to the first body and the second body, another end of the second dual-shaft hinge is assembled to the second fixing member, and the second fixing member forms a second dual protrusion structure.

11. The electronic device according to claim 10, wherein the first dual-shaft hinge and the second dual-shaft hinge have a consistent axial direction, and a dimension of the first dual protrusion structure along the axial direction is greater than a dimension of the second dual protrusion structure along the axial direction.

12. The electronic device according to claim 10, wherein the first dual-shaft hinge and the second dual-shaft hinge have a consistent axial direction, the first body has different recesses of different sizes along the axial direction, the second body has different recesses of different sizes along the axial direction, and the first dual protrusion structure and the second dual protrusion structure are respectively movably accommodated in the different recesses of different sizes.

13. The electronic device according to claim 10, wherein the cover body has a space, the electronic device further comprises a conductive wire, and the conductive wire passes through the space to be electrically connected between an electronic module in the first body and another electronic module in the second body.

14. An electronic device, comprising:
a first body, having an upper surface; a second body; and at least one dual-shaft hinge module, disposed at inner sides of the first body and the second body and connected to the first body and the second body, thereby driving the first body and the second body to relatively rotate via the dual-shaft hinge module to be opened or closed, and the dual-shaft hinge module comprising: a first hinge, assembled to the first body; a second hinge, assembled to the second body; and a fixing member assembled into a cover body and formed a C-shaped structure together with the cover body, the fixing member having a first protrusion portion and a second protrusion portion respectively at two ends of the C-shaped structure, wherein the first protrusion portion and the second protrusion portion are connected to form an accommodation space in the C-shaped structure and a conductive wire passes through therebetween, the first hinge is assembled to the first protrusion portion, and the second hinge is assembled to the second protrusion portion, wherein when the second body rotates relative to the first body from a closed position to an expanded position, the first body and the second body are partially accommodated in the accommodation space, a pivot portion of the first protrusion portion to the first body is located under the upper surface, and a pivot portion of the second protrusion portion to the second body is above the upper surface.

15. The electronic device according to claim 14, wherein the dual-shaft hinge module has a space, the electronic device further comprises a conductive wire, and the conductive wire passes through the space to be electrically connected between an electronic module in the first body and another electronic module in the second body.

16. The electronic device according to claim 14, wherein the first binge has a first shaft, a first torque element and a first bracket, the first bracket and the first torque element are pivoted to an end of the first shaft, another end of the first shaft is fixed to a side of the dual protrusion structure, the first bracket is connected to the first body, the second hinge has a second shaft, a second torque element and a second bracket, the second bracket and the second torque element are pivoted to an end of the second shaft, another end of the second shaft is fixed to another side of the dual protrusion structure, and the second bracket is connected to the second body.

17. The electronic device according to claim 14, wherein a torque of the first hinge is greater than a torque of the second hinge.

18. The electronic device according to claim 16, wherein the fixing member has a thickness along a axial direction of the first hinge or along an axial direction of the second hinge, and the thickness is greater than or equal to 1.5 times of a thickness of the first bracket, or the thickness is greater than or equal to 1.5 times of a thickness of the second bracket.

19. The electronic device according to claim 18, wherein the thickness is 1.5 times to triple of the thickness of the first bracket, or the thickness is 1.5 times to triple of the thickness of the second bracket.

20. The electronic device according to claim 16, wherein the first shaft has a first stop portion, the first bracket has a second stop portion, and a first shaft is pivoted to the first bracket, thereby allowing the first stop portion and the second stop portion to be located on a same path, and the second shaft has a third stop portion, the second bracket has a fourth stop portion, and a second shaft is pivoted to the second bracket, thereby allowing the third stop portion and the fourth stop portion to be located on a same path.

21. The electronic device according to claim 14, comprising a pair of dual-shaft hinge modules having a consistent axial direction, the first body having different recesses of different sizes along the axial direction, the second body having different recesses of different sizes along the axial direction, and a pair of fixing members of the pair of dual-shaft hinge modules being respectively movably accommodated in the different recesses of different sizes.

22. The electronic device according to claim 21, wherein one of the dual-shaft hinge modules has a space, the electronic device further comprises a conductive wire, and the conductive wire passes through the space to be electrically connected between an electronic module in the first body and another electronic module in the second body.

* * * * *